US011891289B2

(12) United States Patent
Bangalore Srinivas et al.

(10) Patent No.: US 11,891,289 B2
(45) Date of Patent: Feb. 6, 2024

(54) DUAL SIDE ACTUATED SCISSOR FORK TYPE LIFT UNIT FOR LIFTING PLURALITY OF PAYLOADS

(71) Applicant: Tata Consultancy Services Limited, Mumbai (IN)

(72) Inventors: Venkatesh Prasad Bangalore Srinivas, Bangalore (IN); Sreehari Kumar Bhogineni, Bangalore (IN)

(73) Assignee: TATA CONSULTANCY SERVICES LIMITED, Mumbai (IN)

(*) Notice: Subject to any disclaimer, the term of this patent is extended or adjusted under 35 U.S.C. 154(b) by 0 days.

(21) Appl. No.: 17/892,783

(22) Filed: Aug. 22, 2022

(65) Prior Publication Data

US 2023/0072140 A1 Mar. 9, 2023

(30) Foreign Application Priority Data

Aug. 26, 2021 (IN) ............................ 202121038654

(51) Int. Cl.

*B66F 9/20* (2006.01)
*B66F 9/18* (2006.01)
*B66F 9/19* (2006.01)

(52) U.S. Cl.

CPC .................. *B66F 9/20* (2013.01); *B66F 9/18* (2013.01); *B66F 9/19* (2013.01)

(58) Field of Classification Search

CPC .......... B66F 7/065; B66F 7/0666; B66F 9/20; B66F 7/0658

See application file for complete search history.

(56) References Cited

U.S. PATENT DOCUMENTS

| | | | |
|---|---|---|---|
| 3,666,128 | A | 5/1972 | Shimizu |
| 9,650,215 | B2 | 5/2017 | Girtman |
| 2003/0214106 | A1 | 11/2003 | Everitt et al. |
| 2012/0180704 | A1 | 7/2012 | Taylor et al. |

FOREIGN PATENT DOCUMENTS

| | | | | |
|---|---|---|---|---|
| CN | 113501465 | A | * | 10/2021 |
| CN | 115010039 | A | * | 9/2022 |
| CN | 115196440 | A | * | 10/2022 |
| CN | 115196537 | A | * | 10/2022 |
| KR | 101601933 | B1 | * | 3/2016 |

* cited by examiner

*Primary Examiner* — Diem M Tran

(74) *Attorney, Agent, or Firm* — FINNEGAN, HENDERSON, FARABOW, GARRETT & DUNNER, LLP

(57) ABSTRACT

There is huge demand for automation in manufacturing, logistics, postal, distribution centers, ecommerce, retail. Typical scissor lift designs can carry large payload but are larger in size. There is a need for a compact fork with more payload carrying capacity. The dual side actuated scissor fork type lift unit is provided. The dual side actuated scissor fork type lift unit includes a top plate, a bottom plate, one or more linear motion (LM) blocks mounted on one or more linear guides, one or more mounting blocks mounted on the one or more LM blocks, and slot on a first end of at least one actuation link is connected to the bottom plate through a pin. The one or more LM blocks is free to slide on the one or more linear guides. The one or more mounting blocks moves along with a motion of the one or more LM blocks.

13 Claims, 8 Drawing Sheets

DUAL SIDE ACTUATED SCISSOR FORK TYPE LIFT UNIT FOR LIFTING PLURALITY OF PAYLOADS

PRIORITY CLAIM

This U.S. patent application claims priority under 35 U.S.C. § 119 to: India Application No. 202121038654, filed on Aug. 26, 2021. The entire contents of the aforementioned application are incorporated herein by reference.

TECHNICAL FIELD

This disclosure relates generally to a robotics system, and, more particularly, to a dual side actuated scissor fork type lift unit for lifting one or more payloads.

BACKGROUND

In present scenario, there is huge demand for automation in companies who are into manufacturing, logistics, postal, distribution centers, ecommerce, retail, etc. Existing scissor lift is a machine made to move personnel and/or an equipment in a vertical direction in majority of cases. These scissor lifts can handle general application i.e., in materials handling industry which include tops of storage racks, that would normally require a ladder, tower or scaffolding. For all these applications, a compact scissor lift is not required and in general most scissor lifts that are available work well. Depending on application a general-purpose scissor lift is chosen. The existing scissor lifts allow workers to work at areas high above ground level without any concern for balance to exercise while using a ladder. However, a ground level pallet transport vehicle e.g., a fork truck or an automated guided vehicle or an autonomous mobile robot is used for lift and transport applications. A fork is used to pick the payload viz: pallet or a roller cages (e.g., metallic carts) for lifting the payload either through a vertical mast or intelligent fork with a scissor lift arrangement. Here, one need is a fork with the scissor lift that is compact to pass through openings in a pallet for the fork to enter, pick up, or in case of roller cage or metallic carts, the fork with scissor lift is unable to move underneath opening between a ground and a cart. Secondly, another need is a compact fork with more payload carrying capacity. Typical scissor lift designs can carry large payload but are larger in size.

SUMMARY

Embodiments of the present disclosure present technological improvements as solutions to one or more of the above-mentioned technical problems recognized by the inventors in conventional systems. For example, in one embodiment, a dual side actuated scissor fork type lift unit is provided. The dual side actuated scissor fork type lift unit includes a top plate; a bottom plate; one or more linear motion (LM) blocks mounted on one or more linear guides; one or more mounting blocks mounted on the one or more LM blocks; and a slot on a first end of at least one actuation link connected to the bottom plate through a pin. A slot on a second end of the at least one actuation link is connected to the slot on the first end of at least one actuation link. The slot on a second end of the at least one actuation link is connected to the top plate. The one or more LM blocks is constrained to slide on the one or more linear guides. The one or more mounting blocks moves along with a motion of the one or more LM blocks. A first end of one or more actuators is fixed to at least one bracket. The one or more mounting blocks is connected to a second end of the one or more actuators, and a first end of a at least one intermediate link through a pin.

In an embodiment, the bottom plate houses the one or more actuators and the one or more linear guides. In an embodiment, a second end of the at least one intermediate link is fixed, and the first end of the at least one intermediate link is a pivot point to actuate a motion of the one or more actuators which leads to lift/lower the second end of the at least one intermediate link. In an embodiment, the one or more mounting blocks and the first end of the at least one intermediate link moves forward when the one or more actuators moves forward. In an embodiment, the one or more actuators expands the one or more intermediate links to lift the at least one actuation link upwards lifting the top plate. In an embodiment, the one or more actuators retracts the one or more intermediate links collapsing the at least one actuation link downwards lowering the top plate. In an embodiment, the one or more linear guides constrain a horizontal motion of the one or more actuators to expand or retract in a straight motion parallel to the one or more linear guides. In an embodiment, a curvilinear end of the at least one support link is connected to a central slot closer to the first end of the at least one actuation link. In an embodiment, a hole end of the at least one support link is connected to at least one of: (i) the first end of the at least one actuation link, and the second end of the at least one actuation link respectively, and (ii) the hole end of the at least one support link through a pin. In an embodiment, the curvilinear end of the at least one support links is connected to the central slot closer to the second end of the at least one actuation link and the second end of the at least one intermediate link through a pin.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 28 is a cross-sectional view depicting the dual side actuated scissor fork type lift unit at a lifted position, according to some embodiments of the present disclosure.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Embodiments of the present disclosure provide a dual side actuated scissor fork type lift unit for lifting of one or more payloads. The dual side actuated scissor fork type lift unit is designed to lift the payloads and transferred using an automated guided vehicle (AGV) or an autonomous mobile robot (AMR) or can be used integrated with a manual pallet truck as well. The dual side actuated scissor fork type lift unit is designed with a bottom plate and a top plate for lifting the payloads. The bottom plate is the main element on which one or more mechanisms are getting mounted.

Figure 1:
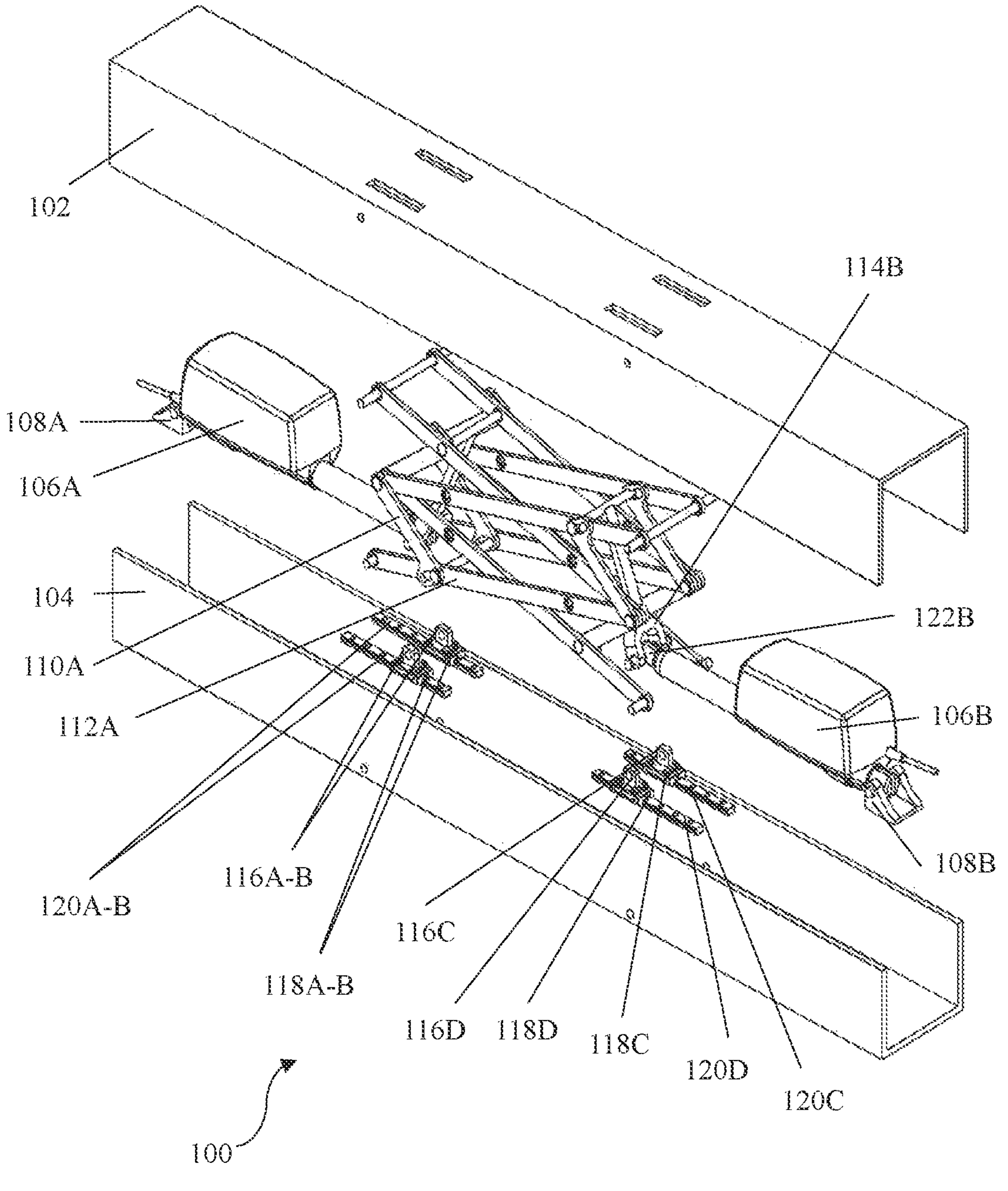
FIG. 1 is an exploded view depicting a dual side actuated scissor fork type lift unit for lifting one or more payloads, according to some embodiments of the present disclosure.

Referring now to the drawings, and more particularly to FIGS. 1 through 61B, where similar reference characters denote corresponding features consistently throughout the figures, there are shown preferred embodiments and these embodiments are described in the context of the following exemplary system and/or method.

Reference numerals of one or more components of the dual side actuated scissor fork type lift unit for lifting the one or more payloads, as depicted in the FIG. 1 through FIG. 6B are provided in Table 1 below for ease of description.

TABLE 1

| S.NO | NAME OF COMPONENT | REFERENCE NUMERALS |
|---|---|---|
| 1 | Dual side actuated scissor fork type lift unit | 100 |
| 2 | Top plate | 102 |
| 3 | Bottom plate | 104 |
| 4 | Plurality of actuators | 106A-B |
| 5 | Plurality of brackets | 108A-B |
| 6 | Plurality of support links | 110A-N |
| 7 | Plurality of actuation links | 112A-N |
| 8 | Plurality of intermediate links | 114A-B |
| 9 | Plurality of mounting blocks | 116A-D |
| 10 | Plurality of linear motion (LM) blocks | 118A-D |
| 11 | Plurality of linear guides | 120A-D |
| 12 | plurality of rod ends of the plurality of actuators | 122A-B |
| 13 | First end of the plurality of intermediate links | 302A |
| 14 | Second end of the plurality of intermediate links | 304A |
| 15 | First end of the plurality of actuation links | 306A |
| 16 | Second end of the plurality of actuation links | 306B |
| 17 | Intermediate hole closer to the first end | 308A |
| 18 | Intermediate hole closer to the second end | 308B |
| 19 | Curvilinear end of the plurality of support links | 310 |
| 20 | Hole end of the plurality of support links | 312 |

Figure 2A:
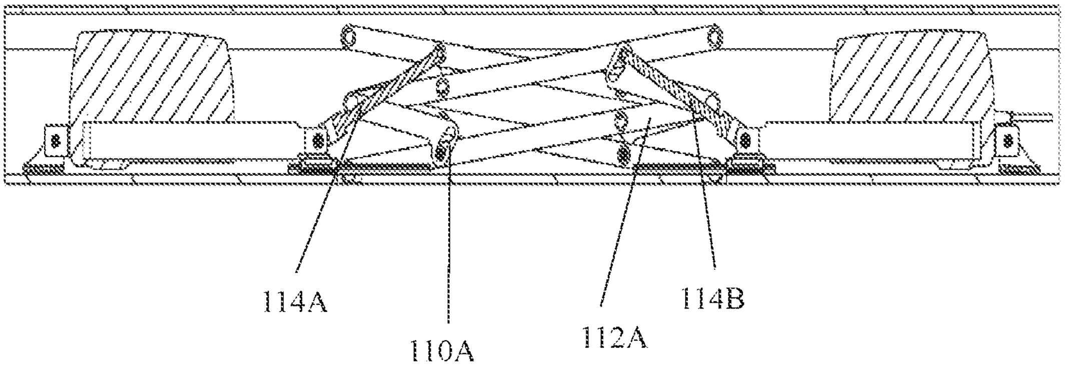
FIG. 2A is a cross-sectional view depicting the dual side actuated scissor fork type lift unit at a collapsed position, according to some embodiments of the present disclosure.
Figure 2B:
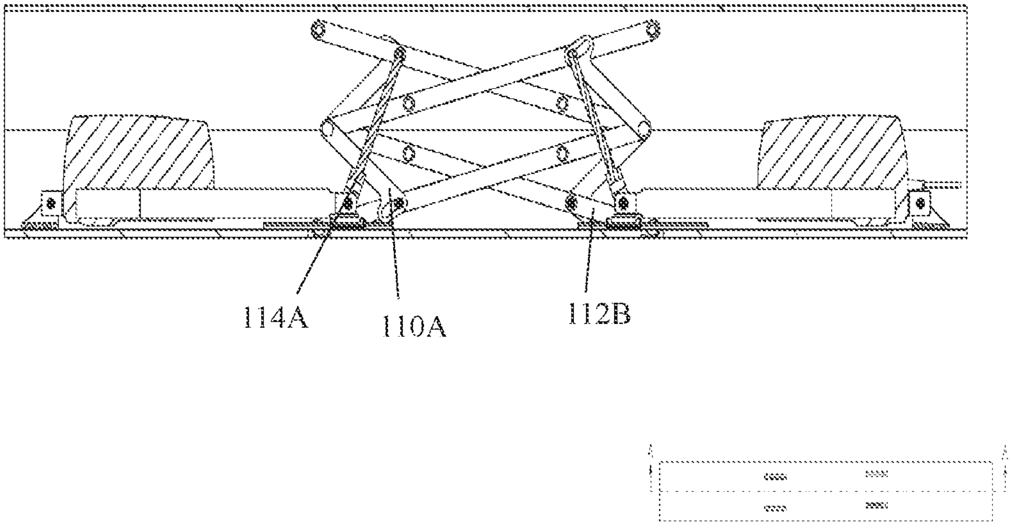
Figure 3A:
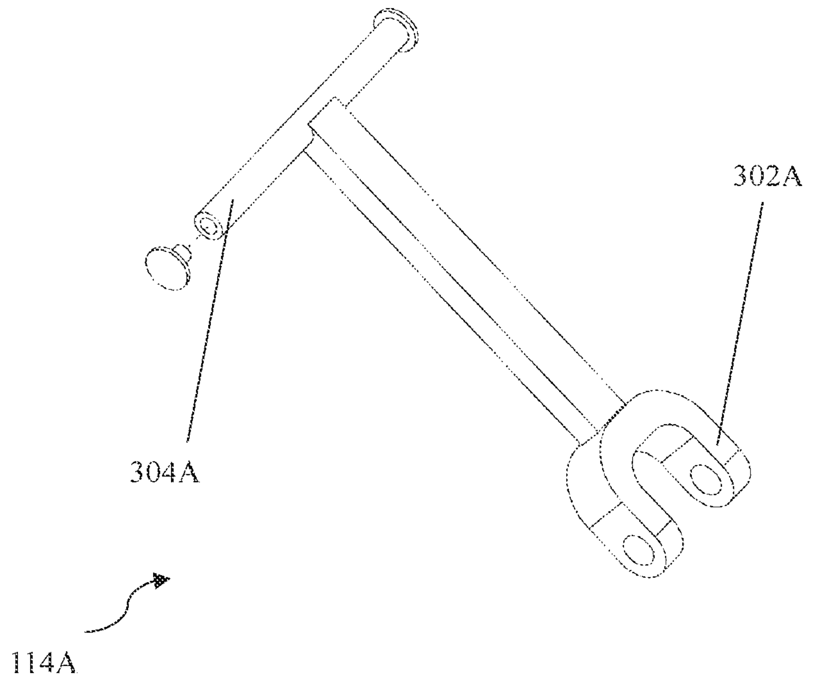
FIGS. 3A-3C are isometric views depicting an intermediate link, an actuation link, and a support link respectively of the dual side actuated scissor fork type lift unit, of the according to some embodiments of the present disclosure.
Figure 3B:
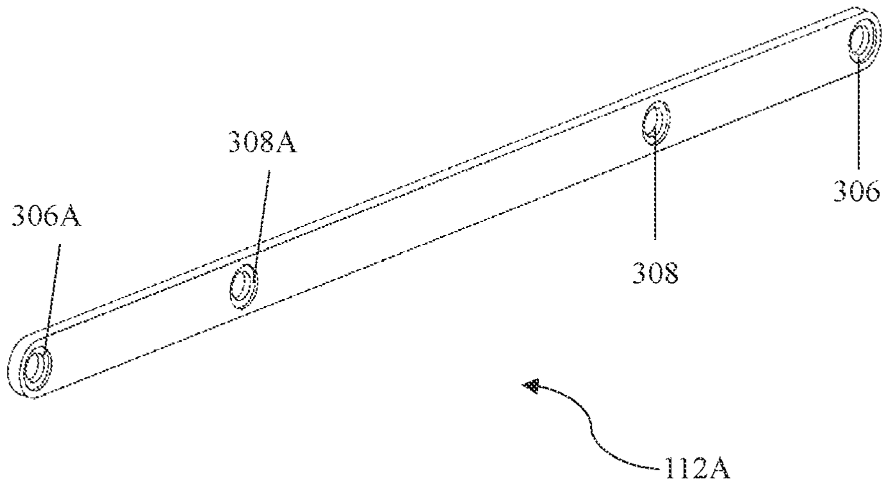
Figure 3C:
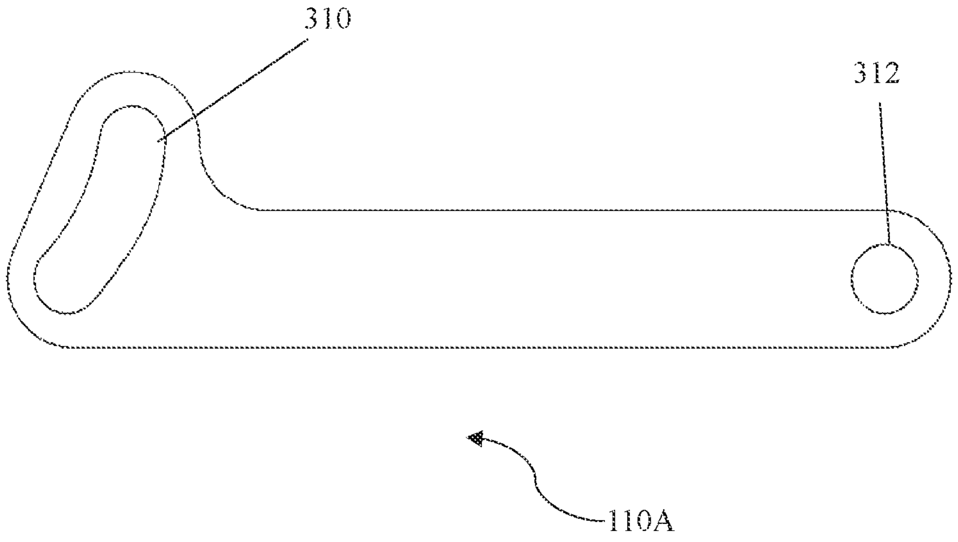

FIG. 1 is an exploded view depicting the dual side actuated scissor fork type lift unit 100 for lifting the one or more payloads, according to some embodiments of the present disclosure. FIG. 2A is a cross-sectional view depicting the dual side actuated scissor fork type lift unit 100 at a collapsed position, according to some embodiments of the present disclosure. FIG. 2B is a cross-sectional view depicting the dual side actuated scissor fork type lift unit 100 at a lifted position, according to some embodiments of the present disclosure. FIGS. 3A-3C are isometric views depicting an intermediate link 114A, an actuation link 112A, and a support link 110A respectively of the dual side actuated scissor fork type lift unit 100, of the according to some embodiments of the present disclosure. The dual side actuated scissor fork type lift unit 100 consist of a top plate 102, a bottom plate 104, the one or more linear motion (LM) blocks 118A-D, and one or more mounting blocks 116A-D. The bottom plate 104 is fixed to a surface without movement while the top plate 102 with one degree of freedom and is free to move up and down. The bottom plate 104 is a main element on which one or more mechanisms are getting mounted. The bottom plate 104 houses the one or more actuators 106A-B and the one or more linear guides 120A-D. The one or more LM blocks 118A-D mounted on one or more linear guides 120A-D. The one or more LM blocks 118A-D is constrained to slide on the one or more linear guides 120A-D. The one or more linear guides 120A-D are fixed to the surface of the bottom plate 104. In an embodiment, the one or more linear guides 120A-D corresponds to four linear guides 120A-D.

The one or more LM blocks 118A-D i.e., four LM block 118A-D is fixed which can slide on top position, one or more mounting blocks 116A-D with a hole is attached to a top position of the one or more LM blocks 118A-D. The one or more mounting blocks 116A-D mounted on the one or more LM blocks 118A-D. The one or more mounting blocks 116A-D moves along with a motion of the one or more LM blocks 118A-D. The one or more mounting blocks 116A-D and the first end 302A of the at least one intermediate link 114A moves forward when the one or more actuators 106A-B moves forward. The one or more actuators 106A-B expands the one or more intermediate links 114A-B to lift the at least one actuation link 112A upwards lifting the top plate 102. The one or more actuators 106A-B retracts the one or more intermediate links 114A-B collapsing the at least one actuation link 112A downwards lowering the top plate 102. The one or more linear guides 120A-D constrains a horizontal motion of the one or more actuators 106A-B to expand or retract in a straight motion parallel to the one or more linear guides 120A-D. The one or more rod ends 122A-B of one or more actuators 106A-B is connected to the one or more mounting blocks 116A-D and one or more intermediate links 114A-B.

In an embodiment, the one or more actuators 106A-B corresponds to an at least one linear actuator. In an embodiment, another end of the one or more intermediate links 114A-B is connected to one or more actuation links 112A-N. The one or more actuators 106A-B moves forward, and the one or more intermediate links 114A-B applies force to the one or more actuation links 112A-N causing the movement around the one or more pivot points and lifting of the top plate 102 and vice versa. A slot on a first end 306A of at least one actuation link 112A connected to the bottom plate 104 through a pin. A slot on a second end 306B of the at least one actuation link 112A is connected to the slot on the first end 306A of at least one actuation link 112F. The slot on a second end of the at least one actuation link 112F is connected to the top plate 102. A second end 304A of the at least one intermediate link 114A is fixed, and the first end 302A of the at least one intermediate link 114A is a pivot point to actuate a motion of the one or more actuators 106A-B which leads to lift/lower the second end 304A of the at least one intermediate link 114A. The bottom plate 104 and the top plate 102 is scalable to a wider width, a height, and a length as required for one or more applications.

Figure 4:
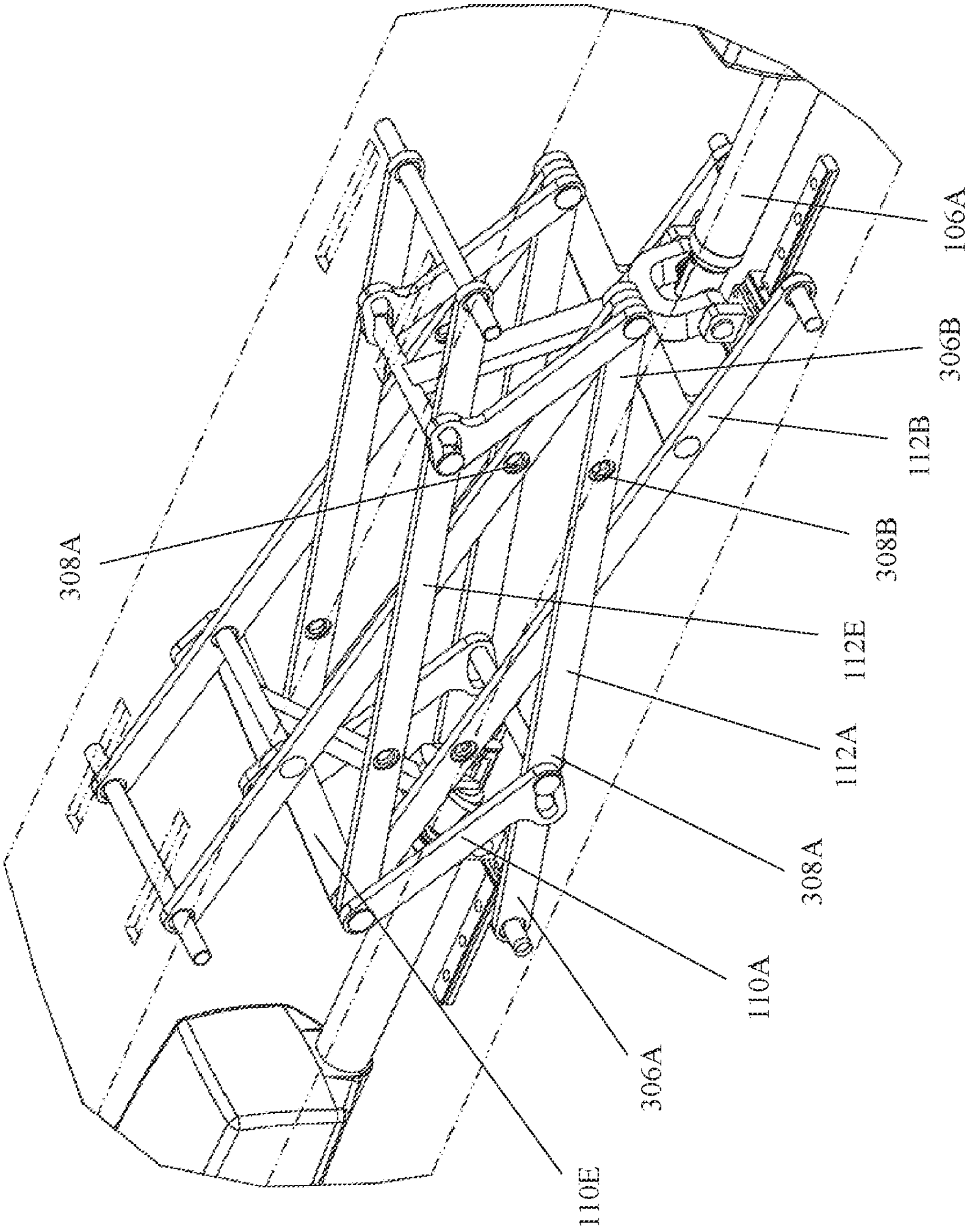
FIG. 4 is an exploded view depicting one or more actuation links of the dual side actuated scissor fork type lift unit at the lifted position, according to some embodiments of the present disclosure.
Figure 5A:
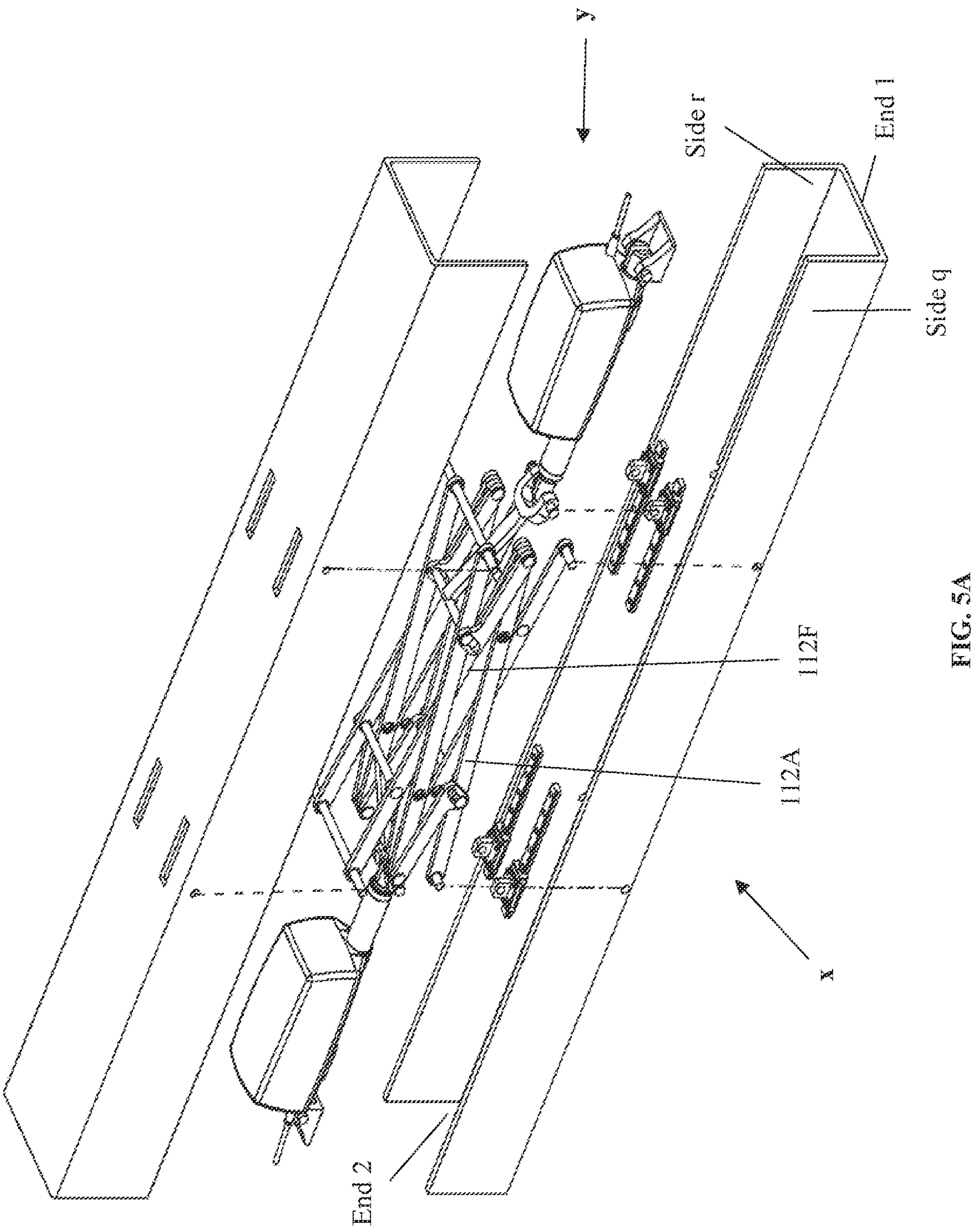
FIGS. 5A-5B are exploded view depicting the dual side actuated scissor fork type lift unit viewed from X and Y direction, according to some embodiments of the present disclosure.
Figure 5B:
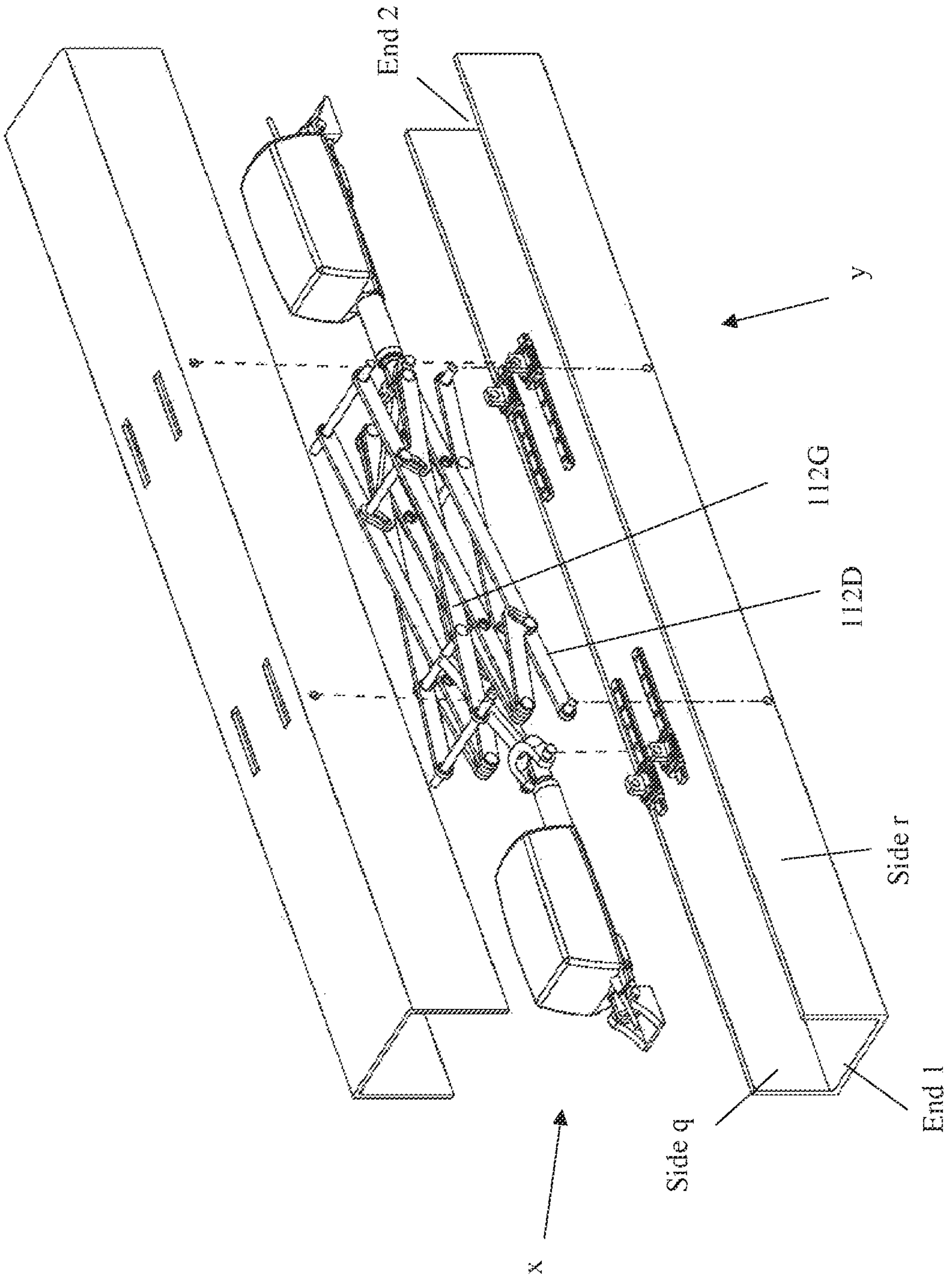
Figure 6A:
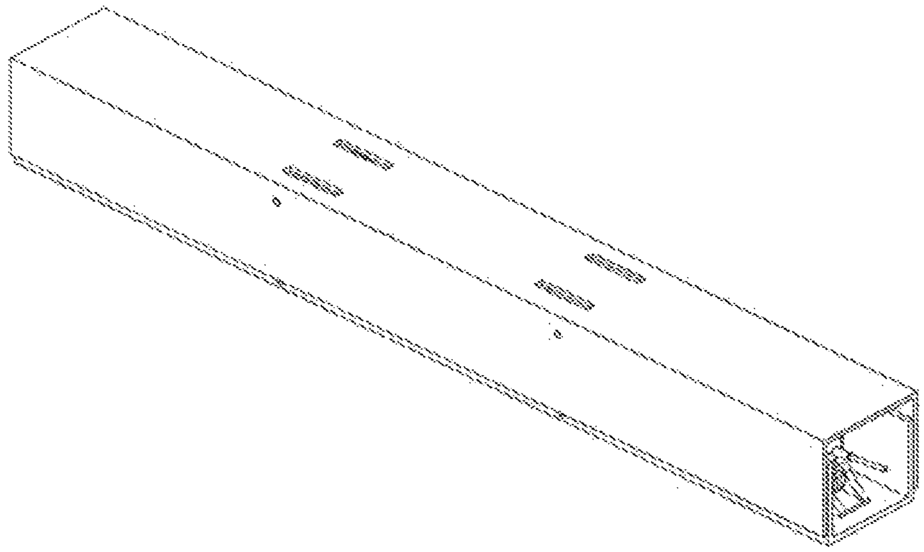
FIG. 6A is an exemplary isometric view depicting the dual side actuated scissor fork type lift unit at the collapsed position, according to some embodiments of the present disclosure.
Figure 6B:
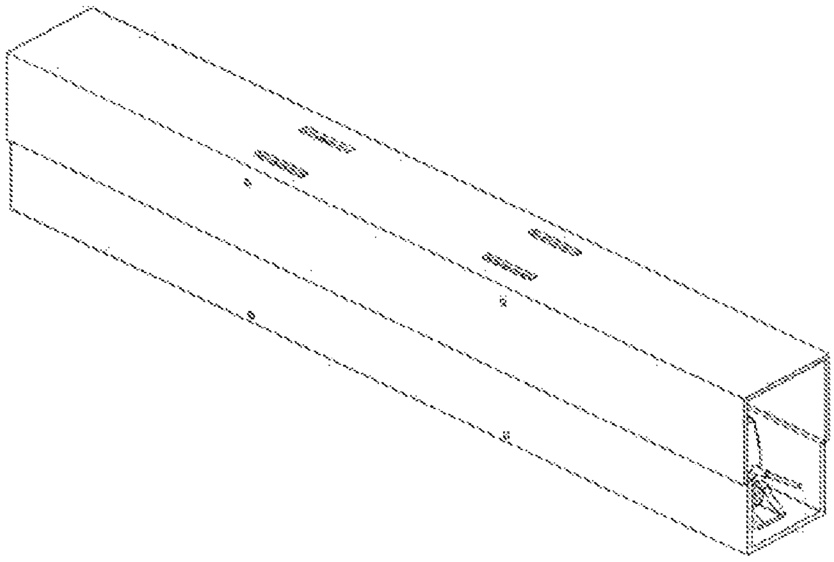
FIG. 6B is an exemplary isometric view depicting the dual side actuated scissor fork type lift unit at an expanded position, according to some embodiments of the present disclosure.

FIG. 4 is an exploded view depicting the one or more actuation links 112A-N of the dual side actuated scissor fork type lift unit 100 at a lifted position, according to some embodiments of the present disclosure. FIGS. 5A-5B are exploded view depicting the dual side actuated scissor fork type lift unit 100 viewed from X and Y direction, according to some embodiments of the present disclosure. FIG. 6A is an exemplary isometric view depicting the dual side actuated scissor fork type lift unit 100 at a collapsed position, according to some embodiments of the present disclosure. FIG. 6B is an exemplary isometric view depicting the dual side actuated scissor fork type lift unit 100 at an expanded position, according to some embodiments of the present disclosure. The dual side actuated scissor fork type lift unit 100 is symmetrical in nature and a motion from a first end of the bottom plate 104 is identical to a motion from a second end of the bottom plate 104.

A one or more brackets 108A-B are fixed to the surface of the bottom plate 104. The one or more brackets 108A-B holds the two actuators 106A-B for motion of the dual side actuated scissor fork type lift unit 100 which also leads to a vertical movement of the top plate 102. A first end of the one or more actuators 106A-B is fixed to the one or more brackets 108A-B while a second end or rod end of the one or more actuators 106A-B is connected to a first end of the one or more intermediate links 114A-B and also connected with the one or more LM blocks 118A-D sitting on top of the one or more linear guides 120A-D through a single connecting pin.

In an embodiment, the dual side actuated scissor fork type lift unit 100 consists of sixteen links i.e., eight actuation links and eight support links. The one or more actuation links 112A-N are connected at the ends in a cross manner with the four-actuation links closer to a side 'r' of the bottom plate 104 and another four-actuation links closer to a side 'q' of the bottom plate 104 in a parallel manner to each other. A hole end of the one or more actuation links 112A-N respectively is pivoted around the bottom plate 104 with help of a pin to provide an angular motion to the one or more actuation links 112A-N. A hole end 312 of the one or more support links 110A-) is connected to at least one of: (i) the first end of the one or more actuation links 112A-N, and the second end of the one or more actuation links 112A-N respectively, and (ii) the hole end 312 of the one or more support links 110A-N through a pin.

In an embodiment, mechanism consists of multiple of a zig-zag link connection. The top plate 102 is free to move in a vertical direction and the bottom plate 104 is fixed to a ground. Hence, motion in the one or more actuation links 112A-N leads to a vertical movement of the top plate 102. The ends of criss-cross links are fixed to the bottom plate 104 and the top plate 102 and hence no sliding mechanism is required at the ends. The dual side actuated scissor fork type lift unit 100 also consists of the one or more support links 110A-N with characteristic curvilinear slot made such that transmits a load coming from the top plate 102 for increasing a rigidity. The one or more support links 110A-N is connected between one zig-zag connection to another. For example, the hole of the support link 110A is connected to a hole of a support link 110C such that the one or more support links 110A-N are pivoted around the hole. The other end of the one or more support links 110A-N includes a curvilinear slot which is connected to hole in the support link 110A.

The curvilinear end 310 of the one or more support links 110A-N is made such that the one or more support links 110A-N gets locked at an end of the motion. The curvilinear end 310 of the at least one support link 110A is connected to a central slot closer to the first end 306A of the at least one actuation link 112A. The curvilinear end 310 of the at least one support links 110A is connected to the central slot closer to the second end 306B of the at least one actuation link 112A and the second end 304A of the at least one intermediate link 114A through a pin. The one or more actuators 106A-B is actuated at both ends of the bottom plate 104 to provide a uniform motion to the top plate 102.

Initially a scissor mechanism is at home position/collapsed position once one or more rod ends 122A-B of the one or more actuators 106A-B starts moving forward to impart an energy to the one or more intermediate links 114A-B thereby leading to a vertical motion of the top plate 102. The one or more intermediate links 114A-B are positioned at an angle to a ground such that there is no deadlock in mechanism and assures lifting happens always in an upward direction. A first end 302A of the one or more intermediate links 114A-B is connected to the one or more rod ends 122A-B of the one or more actuators 106A-B while a second end 304A of the one or more intermediate links 114A-B are connected to at least one point on the one or more actuation links 112A-N. As the one or more rod ends 122A-B of the one or more actuators 106A-B moves forward and the one or more intermediate links 114A-B transforms a horizontal motion at the first end 302A of the one or more intermediate links 114A-B to a vertical motion at the second end.

The lifting height mechanism is controlled by controlling a stroke of the one or more actuators 106A-B. When the one or more rod ends 122A-B of the one or more actuators 106A-B moves forward from initial position to lift up the top plate 102, and the top plate 102 return backs to an original position when retraction of the one or more rod ends 122A-B of the one or more actuators 106A-B. In an embodiment, the one or more support links 110A-N adjust themselves in the curvilinear end 310 of the of the one or more support links 110A-N such that maximum rigidity is obtained when the top plate 102 is at the fully lifted condition.

The embodiments of present disclosure herein address unresolved problem in material handling and transport field where there is requirement of lifting of the payloads and transferring performed by using the AGVs or AMRs. The embodiments of present disclosure thus provide the dual side actuated scissor fork type lift unit for lifting and transferring payload from one location to another location. The embodiment of present disclosure herein provides that the design of the dual side actuated scissor fork type lift unit is very compact without compromising the payload carrying capacity. For example, the dual side actuated scissor fork type lift unit is designed to go underneath a trolley, lift the trolley and transport. The dual side actuated scissor fork type lift unit is very compact in terms of overall dimensions with respect to the lift height and a high payload capacity and can be effortlessly attached to the AGVs and AMRs. The overall body of the dual side actuated scissor fork type lift unit is made very compact in both a height wise and a width wise to work for almost all thin space scenarios. An instalment area taken to mount the dual side actuated scissor fork type lift unit is less. The dual side actuated scissor fork type lift unit is capable of high load lifting with ease. The dual side actuated scissor fork type lift unit in which the design of the orientation of the actuator is in horizontal direction parallel to the ground.

The dual side actuated scissor fork type lift unit is designed with separate load bearing guides to take the vertical loads while providing extra rigidity during travel. The collapsed height of the dual side actuated scissor fork type lift unit is very low when compared with other scissor lifts. The dual side actuated scissor fork type lift unit can be used to lift a high payload capacity by the dual actuators. The support links are utilized to strengthen and make the dual side actuated scissor fork type lift unit more rigid. The driving unit is fixed to the bottom plate of the dual side actuated scissor fork type lift unit while in other scissor lift the driving unit also moves as the scissor link moves. The dual side actuated scissor fork type lift unit is portable and can used for different types of the autonomous mobile robots (AMR).

The dual side actuated scissor fork type lift unit consists of separate linear guides to provide motion with reduced friction to the scissor lift. A combination of low width and low height makes this a unique design. The compactness in length of the dual side actuated scissor fork type lift unit also even though of the two actuators to fit into a maximum size of pallet length of 1.2 m. The design of the dual side actuated scissor fork type lift unit is scalable to a wider width, height and length as required for one or more applications.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A dual side actuated scissor fork type lift unit, comprising:
- a top plate;
- a bottom plate;
- a plurality of linear motion (LM) blocks, wherein
  - each of the plurality of LM blocks includes a top portion and a bottom portion;
  - the top portion includes a hole;
- a plurality of linear guides, wherein
  - the plurality of LM blocks is mounted on the plurality of linear guides, and
  - the plurality of LM blocks is constrained to slide on the plurality of linear guides;
- a plurality of mounting blocks mounted on the plurality of LM blocks, wherein the plurality of mounting blocks moves along with a motion of the plurality of LM blocks;
- at least one bracket attached to a surface of the bottom plate;
- a plurality of actuators includes a first end and a second end, wherein
  - the first end of each of the plurality of actuators is fixed to the at least one bracket, and
  - the second end of each of the plurality of actuators is connected the plurality of mounting blocks; and
- at least one intermediate link that includes a third end and a fourth end, wherein
  - the third end of the at least one intermediate link is connected to the plurality of mounting blocks through a first pin,
  - the third end includes a U-shaped structure,
  - the U-shaped structure includes two holes at an end of the U-shaped structure, and
  - the third end is connected to the second end of each of the plurality of actuators via the two holes of the U-shaped structure,
  - the fourth end includes a horizontal structure, and
  - the horizontal structure includes a removable cap; and
- at least one actuation link includes a first actuation link and a second actuation link, wherein
  - the first actuation link includes a fifth end, and
  - the second actuation link includes a sixth end,
  - the fifth end includes a first slot,
  - the sixth end includes a second slot,
  - the first slot on the fifth end is connected to the bottom plate through a second pin,
  - the second slot on the sixth end connected to the first slot on the fifth end, and
  - the second slot on the sixth end is connected to the top plate.

2. The dual side actuated scissor fork type lift unit as claimed in claim 1, wherein the bottom plate is configured to enclose the plurality of actuators and the plurality of linear guides.

3. The dual side actuated scissor fork type lift unit as claimed in claim 1, wherein the fourth end of the at least one intermediate link is fixed, and the third end of the at least one intermediate link is a pivot point to actuate a motion of the plurality of actuators which leads to lift/lower the fourth end of the at least one intermediate link.

4. The dual side actuated scissor fork type lift unit as claimed in claim 1, wherein the plurality of mounting blocks and the third end of the at least one intermediate link moves forward when the plurality of actuators moves forward.

5. The dual side actuated scissor fork type lift unit as claimed in claim 1, wherein the plurality of actuators expands the plurality of intermediate links to lift the at least one actuation link upwards lifting the top plate.

6. The dual side actuated scissor fork type lift unit as claimed in claim 1, wherein the plurality of actuators retracts the plurality of intermediate links collapsing the at least one actuation link downwards lowering the top plate.

7. The dual side actuated scissor fork type lift unit as claimed in claim 1, wherein the plurality of linear guides constrains a horizontal motion of the plurality of actuators to expand or retract in a straight motion parallel to the plurality of linear guides.

8. The dual side actuated scissor fork type lift unit as claimed in claim 1, further comprising at least one support link that includes a curvilinear end and a hole end, wherein the curvilinear end is connected to a central slot closer to the fifth end than the sixth end.

9. The dual side actuated scissor fork type lift unit as claimed in claim 8, wherein the hole end of the at least one support link is connected to at least one of: (i) the fifth end, and the sixth end of the at least one actuation link respectively, and (ii) the hole end of the at least one support link through a third pin.

10. The dual side actuated scissor fork type lift unit (100) as claimed in claim 8, wherein the curvilinear end of the at least one support links is connected to the central slot closer to the sixth end than the fifth end, and the fourth end of the at least one intermediate link through a fourth pin.

11. The dual side actuated scissor fork type lift unit as claimed in claim 1, wherein the plurality of mounting blocks mounting blocks includes a hole that is attached to a top position of the plurality of LM blocks.

12. The dual side actuated scissor fork type lift unit as claimed in claim 1, wherein a motion from a first end of the bottom plate is identical to a motion of a second end of the bottom plate.

13. The dual side actuated scissor fork type lift unit as claimed in claim 1, wherein the at least one bracket is configured to hold the plurality of actuators.

* * * * *